United States Patent [19]

Horvath

[11] E Re. 30,566

[45] Reissued Apr. 7, 1981

[54] RECHARGEABLE SPRAYER

[75] Inventor: William Horvath, Watchung, N.J.

[73] Assignee: Thiokol Chemical Corporation, Bristol, Pa.

[21] Appl. No.: 631,386

[22] Filed: Nov. 12, 1975

Related U.S. Patent Documents

Reissue of:

[64] Patent No.: 3,790,034
Issued: Feb. 5, 1974
Appl. No.: 226,204
Filed: Feb. 14, 1972

U.S. Applications:

[63] Continuation of Ser. No. 485,631, Jul. 3, 1974, abandoned.

[51] Int. Cl.[2] ..... B67D 5/32; G01F 11/04

[52] U.S. Cl. ..... 222/153; 222/340; 239/333; 239/373

[58] Field of Search ..... 222/153, 321, 340, 380, 222/382-385, 387, 519; 239/321, 333, 337, 373

[56] References Cited

U.S. PATENT DOCUMENTS

| | | | |
|---|---|---|---|
| 1,676,358 | 7/1928 | Schott | 222/340 |
| 1,730,684 | 10/1929 | Phillips | 222/385 X |
| 1,865,914 | 7/1932 | Jaden | 222/321 X |
| 1,871,291 | 8/1932 | Adams et al. | 222/383 X |
| 3,272,390 | 9/1966 | Horwitt | 222/153 |
| 3,355,067 | 11/1967 | Espinal | 222/519 X |
| 3,471,065 | 10/1969 | Malone | 222/321 |

FOREIGN PATENT DOCUMENTS

| | | | |
|---|---|---|---|
| 768271 | 8/1934 | France | 222/386 |

*Primary Examiner*—F. J. Bartuska
*Attorney, Agent, or Firm*—Curtis, Morris & Safford

[57] ABSTRACT

A manually operated, hand-held liquid spraying device which includes a non-pressurized, refillable or non-refillable container, is disclosed. The sprayer is a completely contained device wherein an internal cam in one part of the device which is rotated, causes a displacement of a piston, a part of which is a cam follower. Piston displacement vacates a chamber which is simultaneously charged with liquid. The piston is moved as a result of the cammed motion against a responsor biasing it. The biased responsor generates a hydraulic pressure on the liquid now in the chamber vacated by the piston, since a check valve traps the liquid in the chamber. The liquid is released from the chamber by depressing a push button device, which action uncovers a port in an outlet conduit permitting liquid to flow from the chamber through the conduit and out through a flow connected nozzle in response to the responsor-urged piston moving down through the liquid in the chamber.

20 Claims, 6 Drawing Figures

RECHARGEABLE SPRAYER

Matter enclosed in heavy brackets [ ] appears in the original patent but forms no part of this reissue specification; matter printed in italics indicates the additions made by reissue.

*This is a continuation, of application Ser. No. 485,631 filed July 3, 1974 now abandoned.*

BACKGROUND OF THE INVENTION

1. Field of the Invention

The invention hereinafter to be described is a hand-held spraying device which through its unique arrangement of features and parts permits an atomized spray comparable to that found in aerosol type sprayers now currently enjoying widespread acceptance on the open market. However, aerosol sprayers have disadvantages in that they must be pre-charged, usually with a propellant such as freon or the like, at relatively high pressures. In addition their entire contents are subject to this high pressure, even in storage. Further, such devices often retain high residual pressure even when in the so-called "empty" condition, hence are of high potential danger when discarded.

2. Description of the Prior Art

Devices now currently enjoying favor in the art of atomizing dispensers include the manually operated sprayer described in U.S. Pat. No. 3,471,065 to C. E. Malone. In this device an inner chamber is pressurized by applying a downwardly directed force to the device. This results in one portion telescoping into another portion and operates to effect a pumping action by compressing a spring and simultaneously drawing liquid into a chamber below a piston. Since the piston is urged against the liquid, and a valve below the liquid in the chamber entrance closes, the liquid is trapped therein until released by an appropriate discharge device.

However, while the above sprayer is advantageous over aerosol bombs and the like, it does have certain practical limits insofar as pressure chamber volume is concerned, because in its telescoping member concept its length must be increased, either to charge or discharge, hence liquid capacity under pressure is, of necessity, limited. Thus it is evident that such volume limitations, from a practicality point of view are inherent in these devices.

Other prior art sprayers of the hand-held type usually require constant hand action to pump liquid, such as by triggering or squeezing and the like, and while these enjoy relatively wide-spread usage they do have the disadvantage of poor spray rate control, poor atomization, and from a user standpoint, require much physical effort to operate.

Accordingly, these disadvantages, inherent in the above and in other type devices of this nature, are believed overcome by the herein to be presented invention as will be more apparent from the description which follows.

SUMMARY OF THE INVENTION

This invention relates to improvements in liquid spraying devices and more particularly to improvements in the relatively small, hand-held devices which desirably produce spray mists as fine as, or finer than, that produced by the aerosol spray bombs and triggering devices.

It is therefore, an object of the present invention to provide an efficient, yet simple in operation and construction, rechargeable liquid spraying device, low enough in cost to provide the average person with a refillable, or throwaway, i.e., non-refillable, hand-operated sprayer for spraying in a mist the many liquids commonly used today, i.e., hair sprays, perfumes, toilet water, deodorants, insecticides, as well as for use in other fields such as in the medical field to provide a safe and reliable device for accurately controlled, sterile dispensing of antibiotics, medical alcohol, and other medicines in hospital operating rooms and the like.

Another object is to provide a rechargeable liquid spraying device which is easily held in the hand and which, when charged may be operated in any position or attitude by finger actuation of a push button type of trigger arrangement.

An additional object is to provide a rechargeable liquid sprayer of the character described which may be charged from most any position or attitude so long as liquid remains within the invention.

A further object is to provide a rechargeable liquid spraying device of the character described which is completely safe, requires no outside power and which is capable of dispensing liquid under high pressure in the form of a fine mist, but wherein the bulk of the liquid stored in the device is subjected to atmospheric pressure only, thereby avoiding the explosion hazards of the common aerosol type sprayer.

A still further object of this invention is to provide a rechargeable liquid spraying device of the character described which requires no pressurizing gas to be contained nor other foreign propellant thereby avoiding the problems of contamination and dilution of the liquid product to be dispensed as well as circumventing inherent problems in the use of pre-pressurized devices.

Other objects, features and advantages of the present invention will become apparent from the following detailed description taken in connection with the accompanying drawings in which:

DESCRIPTION OF THE PREFERRED EMBODIMENT

Figure 1:
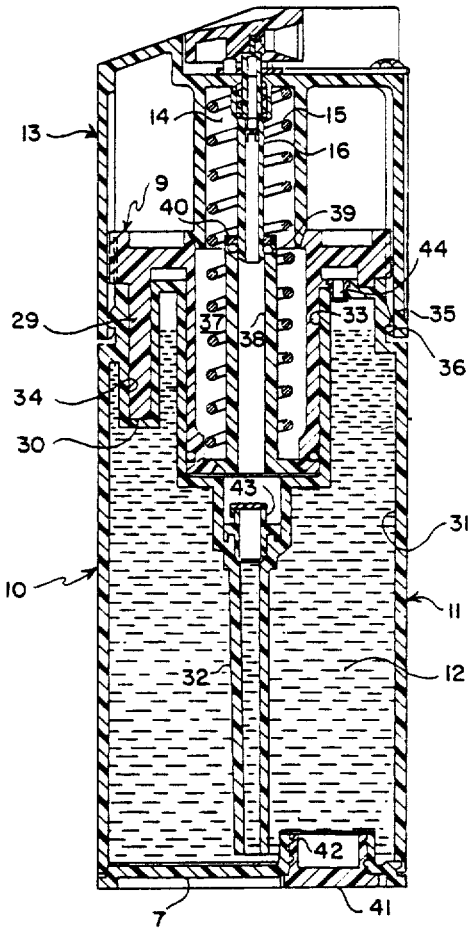
FIG. 1 is a central longitudinal sectional view of an apparatus employing the invention showing same loaded with liquid but as yet uncharged.
Figures 2, 3:
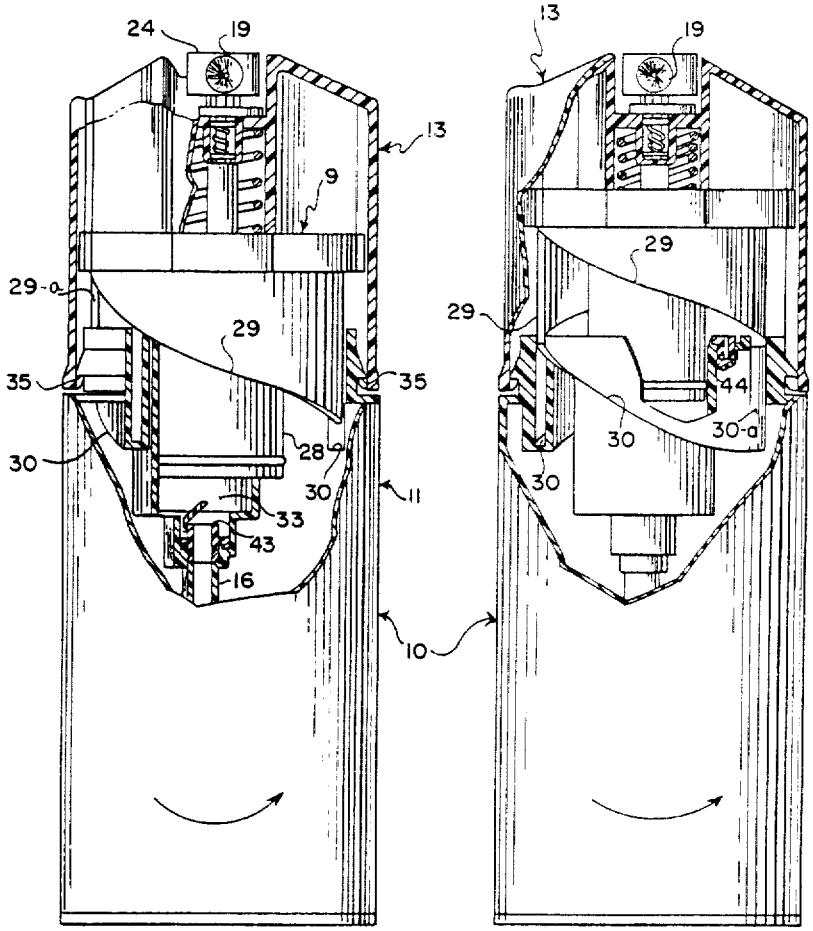
FIG. 2 is a view similar to FIG. 1, partially sectioned, showing the device in an intermediate state of charge or pressurization.
FIG. 3 is a view similar to FIGS. 1 and 2, partially sectioned, showing the invention in a completely charged or pressurized state ready for spraying operation.

Referring in more detail to the accompanying drawings, FIGS. 1 through 3 illustrate a preferred embodiment of a liquid spraying device 10 of the present invention which preferably is dimensioned to be conveniently held in the hand, much in the same manner as the common aerosol bomb much in evidence today. In general, spray device 10 comprises a separable cylindrical container 11 for storing a quantity of liquid 12 to be sprayed, and a cap or spray housing 13 mounted thereon, container 11 and spray housing 13 being two main sub-assemblies of sprayer 10. As best illustrated in FIG. 1, housing 13 comprises a cylindrical recess 14 depending from the top thereof for receiving one end of a biasing member, or responsor 15 in the form shown here for illustration, of a coiled spring, and an outlet conduit 16 centrally disposed in recess 14. It should be readily apparent that other forms of biasing members can be used for responsor 15. Thus flat, Belleville washer type springs either a single element or stacked into a long biasing chain can be used and such will occur to the skilled artisan. Further, responsor 15 need not be of metal, as many plastics now becoming available which have relatively high density and excellent "memory" can be utilized. Polyethylene and polypropylene are examples of such plastics.

Outlet 16 terminates in a central tube 38 formed in a piston 9. Tube 38 at its top (see FIG. 1) is fitted with a liquid seal 39, in this instance an O-ring, although many other suitable seals will occur to skilled artisans. Seal 39 is retained in tube 38 and by a retainer 40 and provides a seal against liquid leakage between tube 38 and the lower end of outlet 16.

Figure 5:
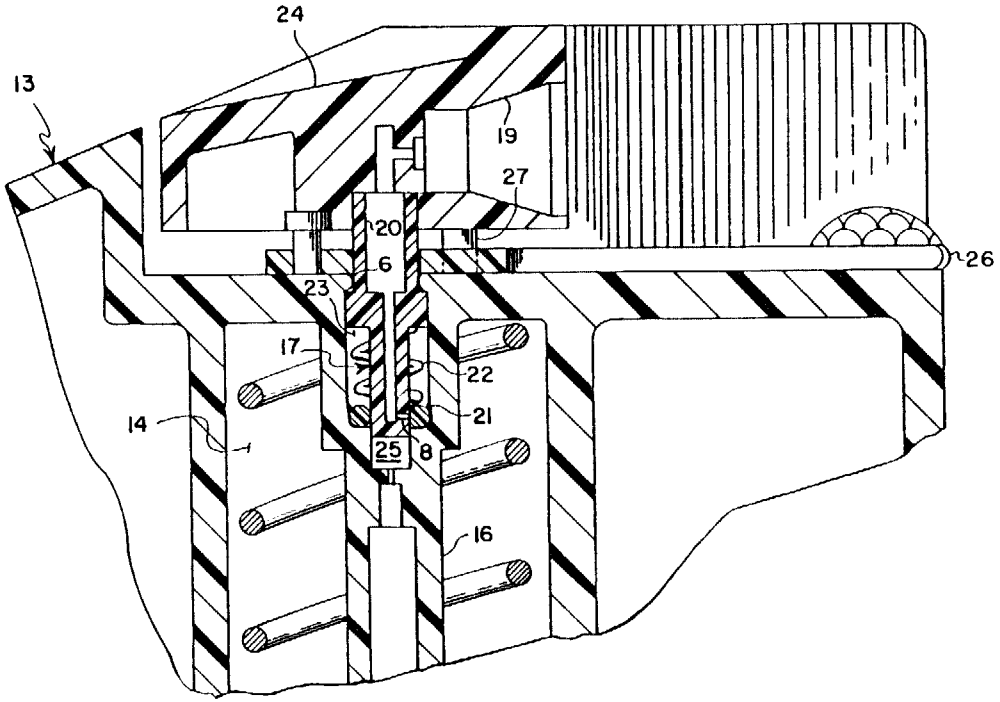
FIG. 5 is a sectional expanded view of a spray nozzle, push button and control valve operated thereby and a typical safety lever, the latter being shown in the "Off" position; and, FIG. 6 is an enlargement, in section, of a portion of FIG. 1, in particular the central and mid upper right-hand portion illustrating the pressure chamber inlet check valve and the air inlet check valve, together with a portion of a piston and charge or pressurization chamber.

In the top of outlet 16, and reference may now be had to FIG. 5 wherein the parts now to be described are shown in clearer detail, is a discharge valve 17 comprising a movable stem 20, a partially precompressed spring 22 positioned in a cavity 23 so as to urge stem 20 against a shoulder 6 at the entrance to cavity 23. The upper portion of stem 20 terminates in sealing relationship in a push button 24 containing a discharge nozzle 19. Stem 20 is formed with flow passages which are flow connected at their lower end to an orifice 8 and at their upper end to nozzle 19. A valve seal 21 adjacent orifice 8 seals against liquid flow therethrough until push button 24 is depressed. Seal 21 in the form of an O-ring is shown; however other seals will adequately accomplish this purpose. It is thus readily apparent that valve 17 is a normally closed device. As stated above when push button 24 is depressed, stem 20 moves downwardly into a second cavity 25 uncovering orifice 8.

A safety lever 26 is mounted on stem 20 between push button 24 and valve 17. Lever 26 has two positions; in one position a plug 27 engages the underside of button 24 and prevents downward movement thereof when pushed. In the other position stop 27 comes into register with a recess (not shown) in the bottom of button 24, and normal movement of push button 24 is permitted. Thus, by lever 26 an "On-Off" capability in sprayer 10 is simply and economically provided.

Figure 6:
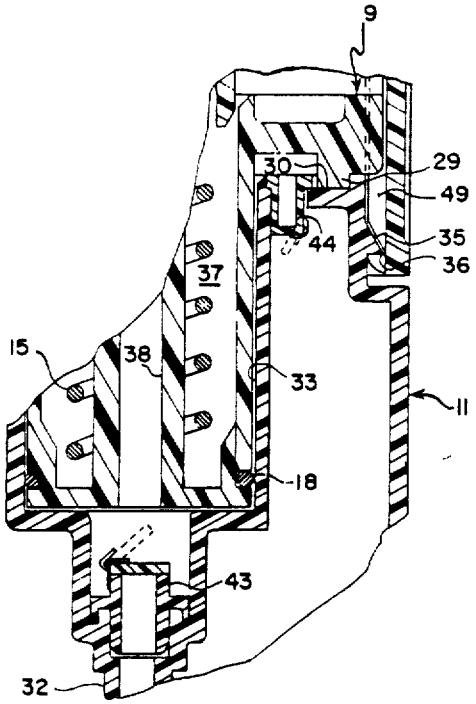

Referring again to FIG. 1, piston 9, as hereinbefore mentioned, has a central tube 38 which, at its upper end, is formed with grooves to accomodate seal 39 and seal retainer 40. At the lower end of piston 9 is a ram end 28 (see FIG. 2) on the outside periphery of which a seal groove is formed to receive a ram end seal 18 (see FIG. 6) the one shown being a preferred type of O-ring although other sealing means well known to the skilled artisan will serve the purpose.

Container 11, the second of two main subassemblies, comprises a receptacle 31 for holding a quantity of liquid 12. An inlet conduit 32 is centrally positioned therein and extends downwardly to a point just above the bottom wall, or cover 7 of container 11. In the embodiment shown wall 7 is adapted to receive, in a threaded fitting 42, a removable filler plug 41, for filling reservoir or receptacle 31 with liquid 12. Obviously, a non-refillable, precharged, and factory sealed container 11 is also contemplated as being within the scope of the present invention. Bottom wall or cover 7 can be pressed on to form a tight seal; however, other sealing methods such as ultra-sonic welding or heat sealing can easily be employed to close cover 7 more permanently and such methods are fully contemplated as being within the inventive purview hereof.

Central inlet conduit 32 terminates in an inlet check valve 43 at the entrance to a liquid pressurizing chamber 33. Valve 43 is arranged to permit flow into chamber 33 but to prevent flow in the opposite direction. A second valve, an air inlet check valve 44, is arranged in the top of container 11 and operates to permit air to flow into receptacle 31, while preventing liquid flow out. Valves 43 and 44 are more clearly illustrated in FIG. 6 which is an enlargement of a portion of FIG. 1.

Container 11 is formed with a peripheral bevelled rim 35, which engages with a peripheral ridge or shelf 36 in cap or spray housing 13, and has a pair of cams or cammed surfaces 30 in cam recesses 34. Cams 30 operatively contact a pair of cam followers 29 and, as will be more fully explained hereinafter, are instrumental in the operation of this invention.

Figure 4:
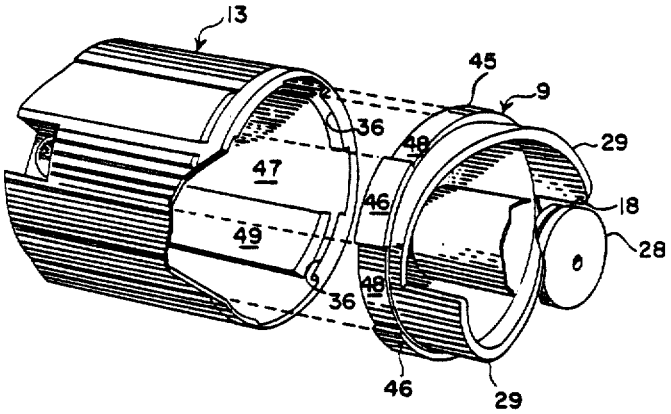
FIG. 4 is a pictorial, exploded view of the cap and piston portions of the invention, partially cut away to show the respective guides or keyways and splines utilized to insure proper engagement of these parts.

Referring now to FIG. 4 there is shown in an exploded view, cap 13 and piston 9 illustrating relationship of these two members when assembled. Cap 13 is formed with inner peripheral splines or keys 49 and adjacent spline recesses or keyways 47, which engage with corresponding recesses 48 and keys 46 respectively on peripheral skirt 45 of piston 9. Also more clearly visible in FIG. 4 are peripheral ridges, shelves, or notches 36 in the bottom of splines 49 which engage bevelled or chamfered rim 35 on container 11 elsewhere described. Piston 9 when assembled with cap 13 is slidably movable therein over splines 49 and keyways 47 on recess 48 and keys 46.

Having described sprayer 10 and its several parts, it should be evident that what has been presented as a genuine advance in the art of dispensing and spraying is a unique combination of elements and parts, economical to produce since all of its parts can be made of plastic. In fact, a particularly preferred plastic material is polypropylene. It is also to be noted that sprayer 10 is easily assembled by unskilled laborers, and obviously, the various parts thereof can be arranged into subassemblies which are thereafter assembled to produce the complete unit. For example, piston 9, fitted with seals 18 and 39 and retainer 40 make a subassembly. Inlet check valve 43, and air inlet check valve 44 installed in appropriate seats in container 11, bottom cover 7 with filler plug 41 in fitting 42 thereon make another subassembly. Preassembled piston 9 can then be assembled in container 11 by inserting cylindrical ram end 28 thereof into chamber 33. Responsor 15 can then be positioned on piston 9 over central tube 38.

Cap 13 with seal 21 in recess 23, valve 17 spring 22 installed on seal 21, stem 20 in recess 23 in spring 22 and seal 21 after being forced by shoulder 6 in the opening on top of cap 13, makes still another subassembly. Stem 20 compresses spring 22 slightly and assumes the position shown in FIG. 5, with orifice 8 adjacent seal 21. Safety lever 26 installed over the upper end of stem 20, push button 24 with nozzle 19 pressed over the top of stem 20 over lever 26, insuring that plugs 27 are in proper position to permit lever 26 to move back and forth around stem 20 into its "On" or "Off" positions as desired, complete cap 13 subassembly.

Subassembly cap 13 is now ready for assembly with subassembly container 11. To complete assembly of sprayer 10 cap 13 is inverted and placed over container 11 with piston 9 therein and responsor 15 protruding from the responsor recess 37 around tube 38, and firmly pressed down, compressing responsor 15, until notches 36 snap into place over bevelled rim 35 on container 11. Sprayer 10 is now completely assembled and ready for filling with liquid which can thereafter be charged and sprayed as desired.

OPERATION OF THE INVENTION

In operation of the present invention, receptacle 31 in container 11 is filled with liquid to be sprayed, or dispensed, and sprayer 10 is charged. To charge, sprayer 10 is grasped in the left hand by cap 13 and held tightly. Container 11 is then grasped with the right hand and rotated to the right (arrows in FIGS. 2 and 3, cap 13 being held stationary during rotation of container 11) 180°, or until a slight click is heard. Rotation of container 11 causes cams 30 to rotate which in turn cause piston 9 to rise up into cap 13, sliding therein on keys 46 and keyways 48 of skirt 45 in corresponding keyways 47 and keys 49, compressing responsor 15 ahead of it. As piston 9 begins to rise, ram end 38 leaves the bottom of chamber 33 creating a slight vacuum. Valves 43 and 44 open permitting liquid 12 to flow into chamber 33 and air to flow into receptacle 31. As shown in FIG. 2, piston 9 is at the beginning of its upward stroke and liquid 12 is filling the partially vacated chamber 33. If at this point rotation of container 11 ceases, the liquid already in chamber 33 will remain therein being under pressure caused by responsor 15, which pressure will cause check valves 43 and 44 to close, trapping the liquid. As rotation of container 11 is resumed, piston 9 reaches the position shown in FIG. 3 and sprayer 10 is now fully charged. It should be understood that sprayer 10 can be charged to any intermediate position between the positions of FIGS. 1 and 3. The only difference with respect to spraying is that in an intermediate charge position cam follower 29 action is slightly different, as will be more fully explained in the following description of the spraying operation.

Assuming now that sprayer 10 is fully charged as in FIG. 3, spraying operation can now begin and is accomplished by placing the index finger on push button 24 and applying a downward pressure there against. This action causes stem 20 to move downwardly into recess 25 (FIG. 5) uncovering orifice 8. Liquid 12 from chamber 33, central tube 38 and outlet conduit 16 then passes around the end of stem 20 and enters the flow passages therein through orifice 8 and out through nozzle 19. Nozzle 19 flow passages can, of course, be sized to give as fine a mist spray as desired. It is also intended and contemplated, to enhance liquid atomization, that the various liquid passages surfaces in nozzle 19 and stem 20 have swirl inducers formed therein or thereon. Such devices (not shown) cause liquid breakup which results in finer sprays and mists.

It should, of course, be understood that sprayer 10 can be charged by rotating cap 13 while container 11 is held stationary, since piston 9 upward movement is the same.

As liquid 12 is discharged from nozzle 19, piston 9 is forced downwardly into chamber 33 by responsor [14] *15*, forcing liquid 12 up through tube 38 and into outlet conduit 16. The motion of piston 9 is downward along a linear path on the verticle surface 29-a of cam follower 29 in slidable contact with the corresponding verticle surface 30-a of cam 30. When fully discharged sprayer 10 and its various working parts will appear as shown in FIG. 1, i.e., piston 9 ram end 28 occupying chamber 33 and cam follower 29 bottomed on cam 30 in recess 34. Of course, the level of liquid 12 in receptacle 31 will be somewhat lower being diminished by the amount sprayed.

As hereinbefore mentioned, sprayer 10 can be charged to any intermediate position by simply ceasing rotation of container 11. However, when spraying liquid with piston 9 in any position short of that of fully charged, piston 9 will move down cam 30 on follower 29 until it again assumes the position shown in FIG. 1.

There has thus been provided a unique and improved, manually operated spray device, which because of its novel features and ingenious charging mechanism advances the art of spraying significantly. It is therefore believed that from the foregoing description, the mode of operation and assembly thereof will be readily apparent to one skilled in the art, it being also understood that variations in the mode of operation, manufacture and assembly will occur to such skilled artisans without departing from the spirit of the invention. Therefore, what is sought to be protected by Letters Patent is set forth in the claims appended hereto, and no limitations as to modifications and changes are to be placed thereupon except as defined in said appended claims.

I claim:

1. A liquid sprayer comprising:

a rotatable container, said container having a receptacle for holding a quantity of liquid, a liquid pressurizing chamber adaptable to receive a charge of liquid, and an opening for filling said receptacle with liquid;

an inlet conduit in said container for conducting said charge from said receptacle to said chamber;

*a first fluid control means in said container permitting liquid to flow into said chamber;*

*a second fluid control means in said container permitting air to flow into said receptacle;*

*a sprayer cap rotatably connected to said container;*

*a movable piston in said cap;*

*compressible means in said cap positioned therein in biasing relationship to said piston;*

*charging means on said container operatively connected to a portion of said piston such that rotation of said container relative to said cap causes said piston to move in said cap to compress said compressible means and pressurize said charge in said chamber;*

*a spray nozzle on said cap for discharging liquid from said chamber;*

*an outlet conduit means for conducting said liquid from said chamber to said spray nozzle;*

*discharging means in said cap for controlling discharge of liquid from said chamber through said nozzle; and,*

*guide means on said piston and in said cap for guiding said piston in said cap.*

2. The sprayer of claim 1 wherein said compressible means is a biasing member contacting said piston and urging said piston away from said cap.

3. The sprayer of claim 1 further including means mounted under said spray nozzle for rendering said nozzle inoperable in one of two positions and operable in the other of said two positions.

4. The sprayer of claim 1 wherein the charging means is a cam.

5. The sprayer of claim 1 wherein the first fluid control means is a check valve.

6. The sprayer of claim 1 wherein the second fluid control means is a check valve.

7. The sprayer of claim 2 wherein the biasing member is a spring.

8. The sprayer of claim 7 wherein the spring is a coiled spring.

9. The sprayer of claim 7 wherein the spring is a flat spring.

10. The sprayer of claim 1 wherein said opening for filling said receptacle is a recloseable plug.

11. A liquid sprayer comprising a rotatable container, said container having a receptacle for holding a quantity of liquid, a liquid pressurizing chamber, and an opening for filling said receptacle with the liquid;

an inlet conduit in said container for conducting liquid from said receptacle to said chamber;

an inlet check valve in said conduit permitting liquid flow into said chamber;

an air inlet check valve in said container permitting air flow into said receptacle;

a sprayer cap rotatably connected to said container;

a movable piston in said cap;

cam means in said container operatively contacting a portion of said piston for moving said piston in said cap in response to rotation of said container relative to said cap;

a spray nozzle in said cap for discharging said liquid from said container;

an outlet conduit for conveying said liquid from said chamber to said spray nozzle;

a discharge valve in said outlet conduit for controlling discharge of liquid from said chamber through said nozzle;

conduit means in said piston connected to said outlet conduit and said pressurizing chamber for conveying liquid from said chamber to said outlet conduit and to said spray nozzle; and, responsor means in said cap contacting said piston in a biasing relationship such that said piston is urged away from said cap and into said pressurizing chamber whereby liquid therein is displaced by said piston in said chamber and forced to flow into said conduit means, into said outlet conduit and said spray nozzle for discharge thereat.

12. The sprayer of claim 10 further including means mounted under said spray nozzle for rendering said nozzle inoperable in one of two positions and operable in the other of said two positions.

13. The sprayer of claim 11 wherein the responser is a spring.

14. The sprayer of claim 13 wherein the spring is a coiled spring.

15. The sprayer of claim 13 wherein the spring is a flat spring.

16. The sprayer of claim 11 wherein said opening for filling said receptacle is a recloseable plug.

*17. The sprayer of claim 1 in which the outlet conduit means comprises a rigid tube communicating with said chamber.*

*18. A liquid dispensing device comprising a container adapted to contain a body of liquid to be dispensed and having a tubular side wall and opposite ends, one of said ends being rotatable relative to said tubular wall, a cylinder disposed in said container inwardly of said tubular side wall and in spaced relationship therewith, a piston slidable relative to said cylinder and defining therewith a pressurizable chamber for the liquid to be dispensed, resilient means operatively associated with said piston and biased to tend to produce relative motion between said piston and cylinder in a direction to pressurize said chamber, liquid dispensing means mounted on one of said ends outside said container, first conduit means effectively interconnecting said chamber and said dispensing means, manually operable valve means in said first conduit means for controlling the flow of liquid therethrough, second conduit means interconnecting said body of liquid and said pressurizable chamber, said second conduit means having a check valve therein for preventing flow of liquid from said pressurizable chamber to said body of liquid, cam means for producing relative reciprocating motion of said piston and cylinder in response to rotary movement of said rotatable end and in a direction to compress said resilient means, said cam means comprising a first circular cam effectively secured to said piston and a second circular cam effectively secured to said cylinder, said first and second cams having opposed cam surfaces encircling said resilient means and urged into contact with one another by said resilient means and means for effectively connecting the rotatable end of said container and one of said cams whereby rotation of said rotatable end causes said cam means to produce relative motion of said piston and cylinder to draw liquid from said body of liquid into said pressurizable chamber.*

*19. In a liquid dispensing device of the type which comprises a container adapted to contain a body of liquid to be dispensed and which is formed in two relatively movable sections, a relatively reciprocable piston and cylinder defining a pressurizable chamber therebetween, resilient means operatively associated with said piston and biased to tend to produce relative motion of said piston and said cylinder in a direction to pressurize said chamber, liquid dispensing means mounted on said container externally thereof, first conduit means effectively interconnecting said chamber and said liquid dispensing means, manually operable valve means in said first conduit means for controlling the flow of liquid therethrough, second conduit means effectively connecting said body of liquid to said chamber, said second conduit means having a check valve therein to prevent flow of liquid from said chamber to said body of liquid, means for effectively connecting one of said movable sections to said piston and means for effectively connecting the other of said movable sections to said cylinder whereby relative motion of said movable sections produce relative movement of said piston and cylinder to compress said resilient means and draw liquid from said body of liquid into said chamber, the improvement which comprises forming said container with said movable sections relatively rotatable, and motion converting means responsive to relative rotation of said sections for producing relative reciprocable movement of said piston and cylinder to draw liquid from said body of liquid into the pressurizable chamber and to pressurize the liquid therein, said motion converting means consisting essentially of a first circular cam effectively connected to*

*said piston and a second circular cam effectively connected to said cylinder, said first and second cams having cooperating cam surfaces urged toward one another by said resilient means and each of said cam surfaces having diametrically opposed high and low points with sloping surfaces between each high and low point whereby relative rotation of said cams produces said relative reciprocating motion of said piston and cylinder.*

*20. In a liquid dispensing device of the type which comprises a container adapted to contain a body of liquid to be dispensed and which is formed in two relatively rotatable sections, means mounted within said container and including a reciprocable piston and cylinder defining a pressurizable chamber therebetween, spring means operatively associated with said piston and biased to tend to produce motion of said piston with respect to said cylinder in a direction to pressurize said chamber, liquid dispensing means mounted on said container, first conduit means effectively interconnecting said chamber and said liquid dispensing means, the first conduit means having a rigid tube portion communicating with said liquid dispensing means, second conduit means effectively connecting said body of liquid to said chamber, means for effectively connecting one of said movable sections to said piston, means for rigidly connecting the other of said movable sections to said cylinder, first cam means associated with said piston and second cam means associated with said cylinder, said two cam means being urged into contact with one another by said spring means and at least one of said cam means having a cam surface extending around said spring means and provided with a plurality of high points and a plurality of low points with sloping cam surfaces therebetween whereby relative rotation of said movable sections produces movement of said piston to compress said spring means and draw liquid from said body of liquid into said chamber.*

* * * * *